United States Patent [19]
Yoshihiro

[11] Patent Number: 5,550,658
[45] Date of Patent: Aug. 27, 1996

[54] REFLECTOR FOR LIQUID CRYSTAL DISPLAY HAVING A NON-PRECIOUS METAL LAYER AND A PRECIOUS METAL LAYER SUCCESSIVELY FORMED ON A PLASTIC FILM

[75] Inventor: Shirai Yoshihiro, Yamatokoriyama, Japan

[73] Assignee: Sharp Kabushiki Kaisha, Osaka, Japan

[21] Appl. No.: 296,683

[22] Filed: Aug. 26, 1994

[30] Foreign Application Priority Data

Aug. 27, 1993 [JP] Japan ................................. 5-213231

[51] Int. Cl.$^6$ ............................................. G02F 1/1335
[52] U.S. Cl. ................... 359/49; 359/63; 359/70; 359/73
[58] Field of Search ............................ 359/70, 49, 73, 359/63

[56] References Cited

U.S. PATENT DOCUMENTS

| | | | |
|---|---|---|---|
| 4,106,859 | 8/1978 | Doriguzzi et al. | 359/70 |
| 4,854,669 | 8/1989 | Birnbach et al. | 359/559 |
| 5,101,260 | 3/1992 | Nath et al. | 257/436 |
| 5,122,890 | 6/1992 | Makow | 359/70 |

FOREIGN PATENT DOCUMENTS

| | | | |
|---|---|---|---|
| 54-158253 | 12/1979 | Japan . | |
| 2-149801 | 6/1980 | Japan . | |
| 58-219526 | 12/1983 | Japan . | |
| 60-482 | 1/1985 | Japan . | |
| 60-117281 | 6/1985 | Japan . | |
| 64-66687 | 3/1989 | Japan . | |
| 3-134623 | 6/1991 | Japan . | 359/73 |
| 3-246502 | 11/1991 | Japan . | |

*Primary Examiner*—Anita Pellman Gross
*Assistant Examiner*—Walter J. Malinowski
*Attorney, Agent, or Firm*—David G. Conlin; Brian L. Michaelis

[57] ABSTRACT

A reflector for a liquid crystal display according to the invention includes: a first metal layer containing a non-precious metal; a second metal layer formed on the first metal layer and containing a precious metal.

20 Claims, 4 Drawing Sheets

REFLECTOR FOR LIQUID CRYSTAL DISPLAY HAVING A NON-PRECIOUS METAL LAYER AND A PRECIOUS METAL LAYER SUCCESSIVELY FORMED ON A PLASTIC FILM

BACKGROUND OF THE INVENTION

1. Field of the Invention

The present invention relates to a reflector, a reflector integrated with a polarizing film, and a reflector integrated with a polarizing film and a retardation film, that are used in liquid crystal display (hereinafter, referred to as LCD) apparatus.

2. Description of the Related Art

Figure 9:
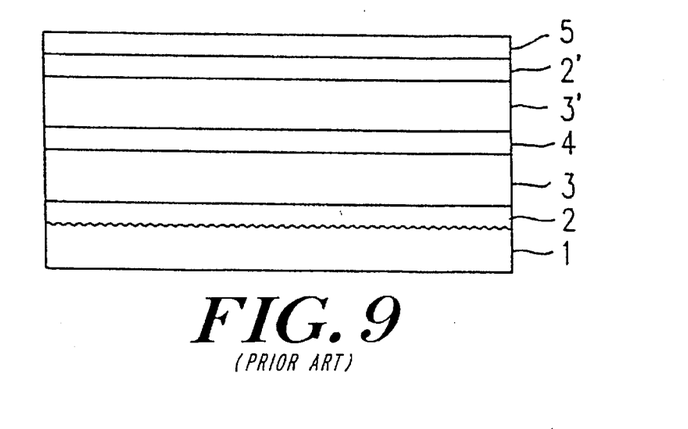
FIG. 9 is a cross sectional view of a conventional reflector integrated with a polarizing film for a liquid crystal display.
Figure 10:
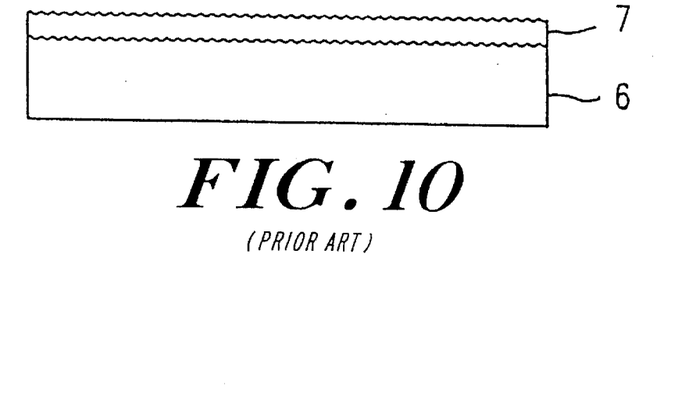
FIG. 10 is a cross sectional view of a conventional reflector.
Figure 11:
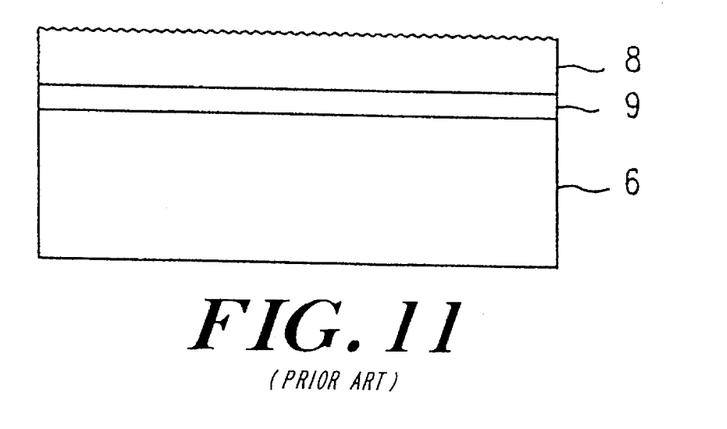
FIG. 11 is a cross sectional view of a conventional reflector.
Figure 12:
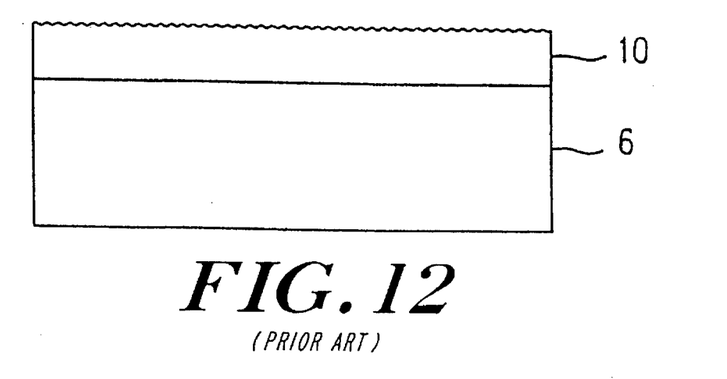
FIG. 12 is a cross sectional view of a conventional reflector.

Conventionally, a TN type LCD, an STN type LCD, a two-terminal device type LCD, and three-terminal device type LCD are used as LCD apparatus. Among these display apparatus, a reflective type liquid crystal display apparatus requiring a polarizing film and a reflector is shown in FIG. 9. The reflector integrated with a polarizing film is constructed by forming an adhesive 2, a protective layer 3, a polarizer 4, a protective layer 3', an adhesive 2', and an interliner 5 on a reflector 1 as shown in FIG. 9. The reflector 1 is categorized into the following three types: a metal vapor deposition type in which a metal film 7 is deposited on a plastic film 6 as shown in FIG. 10; a layered type in which a metal foil 8 is pasted on the plastic film 6 by an adhesive 9 as shown in FIG. 11; and a coating type in which a metal paint 10 is coated on the plastic film 6 as shown in FIG. 12. The metal film 7, the metal foil 8, and the metal paint 10 are mainly made of aluminum. The three types of reflector will be described below in detail.

1. Metal vapor deposition type

A reflector is constructed by forming an aluminum thin film (the metal deposition film 7) having a thickness of 500–600 Å (angstroms) by vapor deposition on a polyethylene terephthalate (PET) film (the plastic film 6) on which an unevenness is formed. The reflector is non-directional. With regard to the method to form the unevenness on the plastic film 6, the following methods are known: forming a film of a synthetic resin mixed with inorganics; sandblasting the surface of the plastic film 6; hydro-honing; coating the surface of the plastic film 6 with a synthetic resin after a chemical processing as disclosed in Japanese Laid-Open Patent Publication No. 60-117281; or the like.

2. Layered type of metal foil 8 and the plastic film 6

(1) Layered type of aluminum foil (the metal film 8) and the plastic film 6:

This type of the reflector is produced as follows. The mat face of an aluminum foil is pasted on a PET film (the plastic film 6), and the glossy face of the aluminum foil is roughened by blasting a grainy substance, such as sand as disclosed in (Japanese Laid-Open Patent Publication No. 3-246502). Alternatively, instead of blasting a grainy substance, contact an embossing roll on the surface of the aluminum foil so as to roughen the surface can be used as disclosed in (Japanese Laid-Open Patent Publications No. 58-219526, and No. 3-246502).

(2) Layered type of aluminum film having hair lines (the metal foil 8) and the plastic film 6:

This type of reflector is produced by repeated rolling of an aluminum foil. The aluminum foil becomes very thin in the last step of the rolling process. Therefore, two sheets of aluminum foil are placed together and rolled, and then separated. The surface of the aluminum foil contacted with the roll is glossy and has a larger reflectivity. The surface contacted with the other aluminum foil becomes mat and has a smaller reflectivity. The mat surface of the aluminum foil (AA1100 or JIS 1N30) is pasted on a PET film (the plastic film 6) by the adhesive 9 so as to form a reflector. Since the reflector has fine concavities and convexities extending vertical to the rolling direction of the aluminum foil, the reflector has directionality in its reflective characteristics, and so the reflective surface may be dark depending on the viewing angles as disclosed in (Japanese Laid-Open Patent Publication No. 58-219526).

(3) Layered type of mat aluminum alloy foil (the metal foil 8) and the plastic film 6:

This type of reflector is produced as follows. An aluminum alloy containing a small amount of iron and manganese is rolled so as to produce a foil. Then, the foil is layered on a PET film with an adhesive between them. Smooth microprojections are formed on the surface of the foil, and the foil is non-directional and glossy as well as disclosed in (Japanese Laid-Open Patent Publication No. 64-66687).

3. Coating type in which the metal paint 10 is coated on the plastic film 6

This type of reflector is produced as follows. An aluminum paint containing aluminum flakes (metal paint 10) is coated on a PET film (plastic film 6) so as to construct a reflector (Japanese Laid-Open Patent Publication No. 60-482). The reflector is non-directional.

The aluminum reflector described above do not have a sufficiently high glossiness. Therefore, when one of these reflector is integrated with a polarizing film or the like and pasted on a liquid crystal panel to make a display device, the display of the device becomes dark. Moreover, in the case of a black and white display, the background color becomes grayish white.

It is known that silver and gold, which are precious metals, have higher reflectivities than that of aluminum in the range of visible light wavelength (G. Hass: "Filmed Surface for Reflecting Optics", Journal of the Optical Society of America, vol. 45, No. 11, pp. 945–952, 1955). Use of silver or gold vapor-deposited film is described in Japanese Laid-Open Patent Publications No. 54-158253 and No. 60-117281. Use of silver foil is described in Japanese Laid-Open Patent Publications No. 2-149801 and No. 3-246502.

The metal used for the vapor-deposited metal film 7, the metal foil 8, and the metal paint 10 of the above-described conventional reflector contain mainly aluminum or aluminum alloy. These reflectors for a liquid crystal display using aluminum or aluminum alloy do not have a sufficient glossiness or diffuse reflectivity. The reflectors for a liquid crystal display using silver or gold, which have higher reflectivities than that of aluminum, are expensive since gold and silver are precious metals, so such reflectors are not for practical use.

SUMMARY OF THE INVENTION

The reflector for a liquid crystal display of this invention includes: a first metal layer containing a non-precious metal; a second metal layer formed on the first metal layer and containing a precious metal.

In one embodiment of the invention, the second metal layer has a higher optical reflectivity than that of the first metal layer.

In another embodiment of the invention, a non-precious metal contained in the first metal layer is a material selected from a group including aluminum and copper.

In another embodiment of the invention, the precious metal contained in the second metal layer is a material selected from a group including gold and silver.

In another embodiment of the invention, the thickness of the second metal layer is equal to or larger than 50 angstroms and smaller than 500 angstroms.

In another embodiment of the invention, the thickness of the second metal layer is equal to or larger than 100 angstroms and smaller than 300 angstroms.

In another embodiment of the invention, the thickness of the second metal layer is smaller than the thickness of the first metal layer.

In another embodiment of the invention, the reflector has a transparent protective film formed on the second metal layer.

In another embodiment of the invention, the reflector has a transparent protective film formed on the second metal layer.

In another embodiment of the invention, the transparent film contains a silicon oxide.

In another embodiment of the invention, the reflector has a polarizing film formed above the second metal layer.

In another embodiment of the invention, the reflector has a retardation film formed above the polarizing film.

In a reflector for a liquid crystal display according to the invention, since the second metal layer containing gold or silver is formed very thinly (equal to or larger than 50 Å and smaller than 500 Å, or equal to or larger than 100 Å and smaller than 300 Å) on the first metal layer containing aluminum or copper, the incident light is blocked by the first metal layer, or both of the first and second metal layers. Moreover, the light is reflected mainly by the second metal layer, and the glossiness and the diffuse reflectivity is equivalent to or close to that attained by a reflector made only of a precious metal can be obtained. Furthermore, the reflector according to the invention can be produced with a smaller amount of precious metal compared with that required for a reflector made only of a precious metal, and thus the reflector can be produced inexpensively. In addition, by forming a transparent protective layer on the precious metal layer, the reflective layer is prevented from being damaged, and a reliable reflector for a liquid crystal display can be obtained. When the precious metal is silver, since the silver is protected by the transparent protective film, it is not likely to be tarnished or damaged. Aluminum, aluminum alloy, copper, copper alloys, or the like can be used for the first metal layer. Gold, gold alloy, silver, silver alloy, or the like can be used for the second metal layer.

Thus, the invention described herein has the following advantages:

(1) A reflector having higher glossiness or diffusion reflectivity than that of a conventional reflector can be obtained.

(2) A reflector having high glossiness or diffusion reflectivity can be produced inexpensively.

(3) Since a transparent protective film is formed on the surface of a reflector having high glossiness or diffusion reflectivity, the reflector does not tend to be damaged on the occasions such that a polarizing film is pasted on the reflector. Moreover, when the reflective surface is a silver layer, the change of the color or tarnishing of the silver which occurs when silver is exposed to air for a long period of time can also be prevented. Thus, a reflector for a liquid crystal display having high quality and reliability can be provided.

(4) Inexpensive and a more reflective reflectors can be provided.

These and other advantages of the present invention will become apparent to those skilled in the art upon reading and understanding the following detailed description with reference to the accompanying figures.

DESCRIPTION OF THE PREFERRED EMBODIMENTS

The examples of the reflector for a liquid crystal display according to the invention will be described with reference to the appended figures.

EXAMPLE 1

Figure 1:
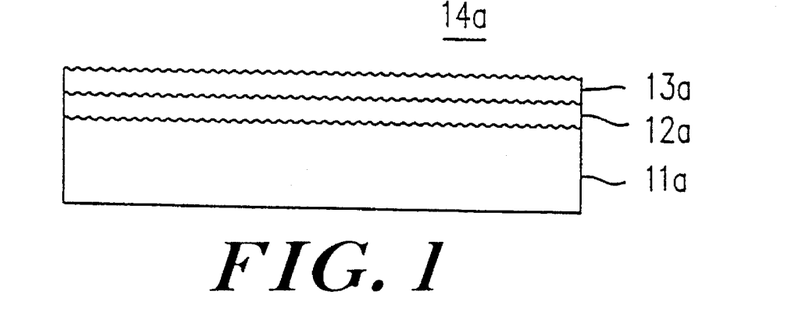
FIG. 1 is a cross sectional view of a reflector for a liquid crystal display of the first example according to the invention.

As shown in FIG. 1, the first example of the reflector for a liquid crystal display according to the invention comprises: a plastic film 11a having an uneven surface; a metal thin film 12a formed on the uneven surface of the plastic film 11a as the first metal layer; and a metal thin film 13a formed on the metal thin film 12a as the second metal layer. The metal thin film 12a is a film made of a non-precious metal. A film containing a non-precious metal can be used for the metal thin film 12a. The metal thin film 13a is a film made of a precious metal. A film containing a precious metal can be used for the metal thin film 13a.

The metal thin film 12a contains a non-precious metal reflecting visible light or a particular range of frequencies of visible light. The metal thin film 13a contains a precious metal having a higher reflectivity than those of non-precious metals with regard to visible light or in a range of particular frequencies of visible light. For the precious metal, silver, gold, silver alloy, gold alloy, or the like is used. The thickness of the metal thin film 13a is equal to or higher than 50 Å (angstroms) and smaller than 500 Å, and preferably, equal to or higher than 100 Å and equal to or smaller than 300 Å. It is not preferable to form the metal thin film 13a having a thickness smaller than 50 Å, since the film tends to have holes, and therefore, it is difficult to form a uniform film. If the metal thin film 13a has a thickness equal to or larger than 500 Å, since reflection of light occurs only at the metal thin film 13a, there is no advantage in providing a plurality of metal layers. In addition, the thicker precious metal layer increases the cost for producing the reflector.

In a reflector 14a according to the invention, the plastic film 11a is made of a polyethylene terephthalate film containing 5 percent silica sands (or quartz sands) by weight. The silica sands have an average diameter of 5 μm. The thickness of the polyethylene terephthalate film is 70 μm. The surface of the polyethylene terephthalate film is roughened and thus made uneven. Aluminum is used for the metal thin film 12a. The aluminum layer is formed by vacuum vapor deposition on the surface of the polyethylene terephthalate film so as to have a thickness of 450 Å. Silver is used for the metal thin film 13a. The silver layer is formed on the metal thin film 12a so as to have a thickness of 300 Å. The non-directional reflector 14a having the construction described above is accordingly obtained.

The plastic film 11a of Example 1 may be made of a stretched or unstretched polyethylene terephthalate (PET) film, a stretched or unstretched polypropylene (OPP) film, a polyamide film, a polycarbonate film, an acetate film, an acrylic film, or a material in which an inorganic substance, organic substance, dye, pigment, or the like is added to any of the films listed above. However, it is most preferable to use a polyethylene terephthalate film which has excellent size stability and physical strength. A polyethylene terephthalate film having a thickness between 20 μm and 100 μm is used in the example. The unevenness on the plastic film 11a may be formed by the following methods: forming a film of a synthetic resin mixed with inorganics; sand-blasting the surface of the plastic film; hydro-honing; and coating the surface of the plastic film with a synthetic resin after a chemical processing.

The aluminum layer and the silver layer may be formed by vacuum vapor deposition or plating. However, it is preferable to use vacuum vapor deposition to obtain a high reflectivity. When a reflector is formed by aluminum and silver layers, it is preferable that the thickness of the silver layer is equal to or smaller than the total thickness of the aluminum and silver layers, or equal to or smaller than 300 Å.

EXAMPLE 2

Figure 2:
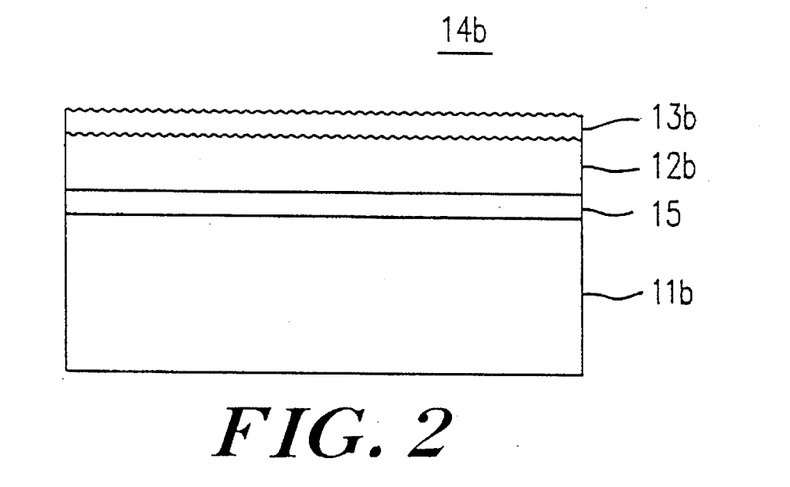
FIG. 2 is a cross sectional view of a reflector for a liquid crystal display of the second example according to the invention.

As shown in FIG. 2, the second example of the reflector for a liquid crystal display according to the invention comprises: a plastic film 11b; a metal foil 12b pasted on the plastic film 11b by an adhesive 15 as the first metal layer; a metal thin film 13b formed on the metal foil 12b as the second metal layer. The metal foil 12b is a metal foil made of a non-precious metal. A metal foil containing a non-precious metal can be used for the metal foil 12a. The metal thin film 13b is a thin film made of a precious metal. A thin film containing a precious metal can be used for the metal thin film 13b.

The examples of the materials used in each layer constituting a reflector 14b for a liquid crystal display of the example will be described by means of the following four instances.

(1) The case where a polyethylene terephthalate (hereinafter, referred to as PET), an aluminum film having unevenness on the surface thereof, and silver having a thickness of 250 Å are used as the plastic film 11b, the metal foil 12b, and the metal thin film 13b, respectively.

In this case, the mat surface of an aluminum foil having a thickness of 15 μm is pasted to a polyethylene terephthalate film having a thickness of 50 μm with a two component system urethane dry laminate adhesive. Then, after roughening the glossy surface of the aluminum foil by blasting glass beads on the surface, silver is deposited by vacuum vapor deposition on the roughened aluminum surface so as to have a thickness of 250 Å. A reflector having a high reflectivity with regard to visible light is accordingly formed.

(2) The case where a PET, a copper foil having unevenness on its surface, and gold having a thickness of 300 Å are used as the plastic film 11b, the metal foil 12b, and the metal thin film 13b, respectively.

In this case, the mat surface of the copper foil having a thickness of 30 μm is pasted to the polyethylene terephthalate film having a thickness of 70 μm with a two component system urethane dry laminate adhesive. The glossy surface of the copper foil is toughened by embossing the surface using a embossing roll. Then, gold is deposited on the roughened copper foil so as to have a thickness of 300 Å. A reflector having a high reflectivity with regard to visible light is accordingly formed.

(3) The case where a PET, an aluminum foil having hair lines, and silver having a thickness of 150 Å are used as the plastic film 11b, the metal foil 12b, and the metal thin film 13b, respectively.

In this case, the mat surface of the 30 μm thick aluminum foil having hair lines is pasted on the polyethylene terephthalate film having a thickness of 70 μm with a two component system urethane dry laminate adhesive. Then, silver is deposited by vacuum vapor deposition on the glossy surface of the aluminum foil having hair lines so as to have a thickness of 150 Å. A reflector having hair lines is accordingly formed.

(4) The case where a PET, an aluminum alloy foil, silver having a thickness of 200 Å are used as the plastic film 11b, the metal foil 12b, and the metal thin film 13b, respectively.

In this case, the metal foil 12b is formed of the aluminum alloy foil made by rolling a 15 μm thick aluminum alloy containing a small amount of iron and manganese. The aluminum alloy foil is layered on a polyethylene terephthalate film with a two component system urethane dry laminate adhesive. Then, silver is deposited by vacuum vapor deposition on the surface of the aluminum alloy foil so as to have a thickness of 200 Å. A non-directional reflector is accordingly formed.

In order to form unevenness on the surface of the metal foil 12b formed on the plastic film 11b of the example, the following methods are used: contacting a roll having unevenness with the foil; blasting grainy substances, such as sands; use of an alloy film having unevenness; or the like.

Other methods can also be used for forming the metal foil 12b on the plastic film 11b. The thickness of the metal foil 12b is between 3 and 30 μm. The adhesive is selected according to the plastic film. A two component system urethane dry laminate adhesive, an acid-denatured polyethylene adhesive, a linear polyester adhesive, or a polyvinyl acetate emulsion, is used for the adhesive 15. However, other adhesives can also be used for the adhesive 15. The plastic film 11b may be pressed on the binding surface of the metal foil 12b to form layers after melting or softening the binding surface of the plastic film 11b.

EXAMPLE 3

Figure 3:
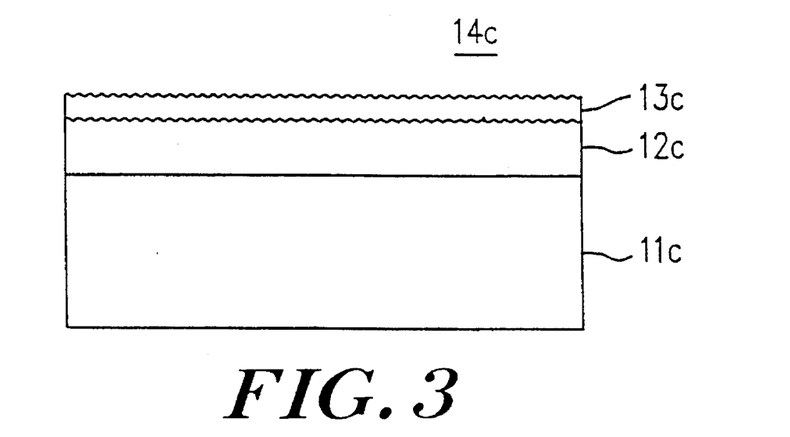
FIG. 3 is a cross sectional view of a reflector for a liquid crystal display of the third example according to the invention.

As shown in FIG. 3, the third example of the reflector for a liquid crystal display according to the invention comprises: a plastic film 11c, a non-precious metal paint 12c coated on the plastic film 11c as the first metal layer, a metal thin film 13c formed on the non-precious metal paint 12c as the second metal layer. The non-precious metal paint 12c is a paint containing a non-precious metal. The metal thin film 13c is a thin film formed of a precious metal or a thin film containing a precious metal.

In reflector 14c of the example, a polyethylene terephthalate film having a thickness of 100 μm is used as the plastic film 11c. An aluminum paint made of a mixture of aluminum flakes and a linear polyester resin is used as the non-precious metal paint 12c. The aluminum paint is coated by a roll coater, and dried. Then silver as the metal thin film 13c is deposited by vacuum vapor deposition so as to have a thickness of 300 Å. The non-directional reflector 14c is accordingly obtained.

The precious metal contained in the second metal layers in Examples 1–3 may be silver; silver alloys; silver containing impurities; gold; gold alloys; gold containing impurities; or the like. However, other materials can also be used for the precious metal. Though the second metal layer can be formed by vacuum vapor deposition, plating, or the like, vacuum vapor deposition is preferable to obtain a high reflectivity.

The reflectors 14a, 14b, and 14c described in Examples 1–3 can be used for display modes which do not require a polarizing film (for example, a phase change guest-host type TFT, polymer dispersed LCD, etc. ) if an adhesive layer is formed on the reflective side of these reflectors. They are also used for the same purpose if a transparent protective film is formed on the surface of the reflectors and an adhesive layer is formed on the plates. In the case of the liquid crystal modes which require a polarizing film and a retardation film (for example, a three-terminal type LCD, a two-terminal type LCD, an STN type LCD, a TN type LCD, an SH type LCD, an SSFLC, an antiferroelectric LCD, or the like), it is preferable to integrate the polarizing film or both the polarizing film and the retardation film with the reflector.

EXAMPLE 4

Figure 4:
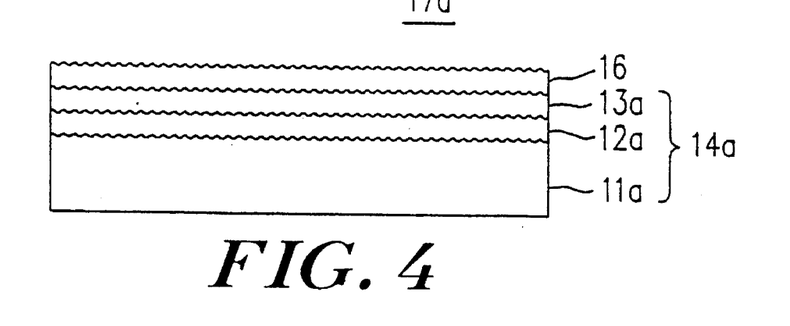
FIG. 4 is a cross sectional view of a reflector for a liquid crystal display of the fourth example according to the invention.

As shown in FIG. 4, the fourth example of the reflector 17a for a liquid crystal display according to the invention has a reflector 14a which is the same reflector as shown in Example 1, and a transparent protective film 16 formed on the reflector 14a. Having such a construction, the reflector of this example has an advantage in that the reflective surface of the reflector 14a is not damaged when the reflector is integrated with a polarizing film or the like.

As shown in FIG. 4, the fourth example of the reflector 17a for a liquid crystal display comprises: the plastic film 11a, the metal thin film 12a formed on the plastic film 11a as the first metal layer; the metal thin film 13a formed on the metal thin film 12a as the second metal layer. The transparent protective film 16 is formed on the metal thin film 13a. The metal thin film 12a is a film made of a non-precious metal or a film containing a non-precious metal. The metal thin film 13a is a film made of a precious metal or a film containing a precious metal.

In this example, a mat processed film having a thickness of 50 μm is used for the plastic film 11a. The mat processed film is obtained by forming unevenness on the surface of a polyethylene terephthalate film by sand-blasting and coating the surface with a polyester resin. Aluminum is used for the metal thin film 12a. The metal thin film 12a is formed on the mat processed surface of the plastic film 11a by vacuum vapor deposition so as to have a thickness of 400 Å. Silver is used for the metal thin film 13a. The metal thin film 13a is formed on the metal thin film 12a so as to have a thickness of 200 Å. As the transparent protective layer 16, $SiO_x$ (silicon oxide) is formed on the metal thin film 13a by vacuum vapor deposition. The non-directional reflector 17a having a protective film is obtained according to the construction described above.

EXAMPLE 5

Figure 5:
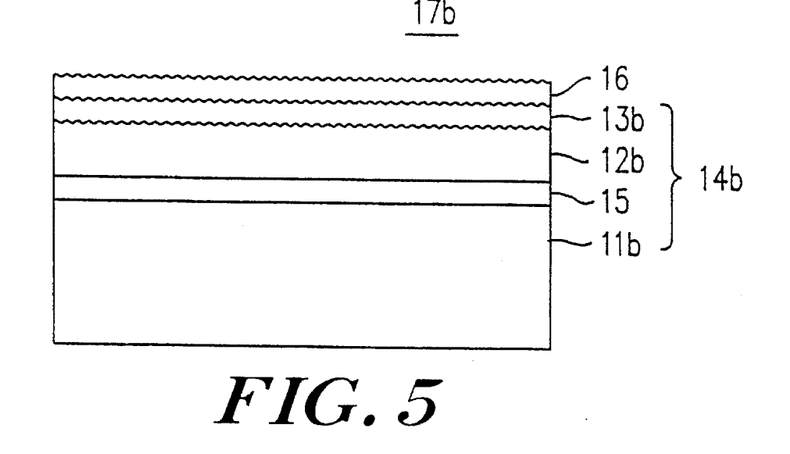
FIG. 5 is a cross sectional view of a reflector for a liquid crystal display of the fifth example according to the invention.

As shown in FIG. 5, the fifth example of the reflector 17b for a liquid crystal display according to the invention has a reflector 14b which is the same reflector of Example 2 and a transparent protective film 16 formed on the reflector 14b. Having such a construction, the reflector of this example has an advantage in that the reflective surface of the reflector 14b is not damaged when the reflector is integrated with a polarizing film or the like.

As shown in FIG. 5, the fifth example of the reflector 17b for a liquid crystal display comprises: the plastic film 11b; the metal foil 12b pasted on the plastic film 11b by an adhesive 15 as the first metal layer; and the metal thin film 13b formed on the metal foil 12b as the second metal layer. The transparent protective film 16 is formed on the metal thin film 13b. The metal foil 12b is a metal foil made of a non-precious metal or a metal foil containing a non-precious metal. The metal thin film 13b is a thin film made of a precious metal or a thin film containing a precious metal.

EXAMPLE 6

Figure 6:
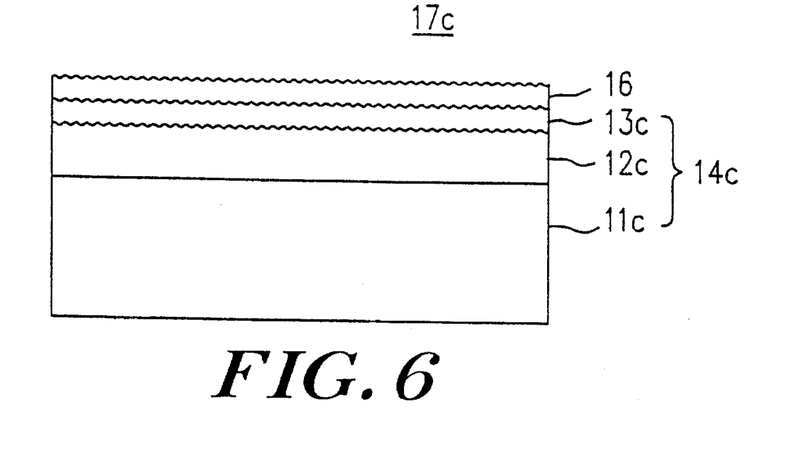
FIG. 6 is a cross sectional view of a reflector for a liquid crystal display of the sixth example according to the invention.

As shown in FIG. 6, the sixth example of the reflector 17c for a liquid crystal display according to the invention has a reflector 14c which is the same reflector as shown in Example 3, and a transparent protective film 16 formed on the reflector 14c. Having such a construction, the reflector of this example has an advantage in that the reflective surface of the reflector 14c is not damaged when the reflector is integrated with a polarizing film or the like.

As shown in FIG. 6, the sixth example of the reflector 17c for a liquid crystal display according to the invention comprises: the plastic film 11c, the non-precious metal paint 12c coated on the plastic film 11c as the first metal layer, and the metal thin film 13c formed on the non-precious metal paint 12c as the second metal layer. The transparent protective film 16 is formed on the metal thin film 13c. The non-precious metal paint 12c is a paint containing a non-precious metal. The metal thin film 13c is a thin film formed of a precious metal or a thin film containing a precious metal.

A transparent inorganic thin film, such as $SiO_x$; a silicone resin; or an acrylic resin can be used for the transparent protective film 16 described in Examples 4 to 6. However, any material having high resistance to frictional damages can be used for the transparent protective film 16, and the materials used for the transparent film 16 are not limited to those listed above. The reflectors 17a, 17b, and 17c having the transparent protective film 16 can be used in the liquid crystal apparatus which do not require the polarizing film if an adhesive layer is formed on the reflectors. These reflectors can also be used in the liquid crystal apparatus which require the polarizing film by being integrated with the polarizing film, a retardation film or the like.

EXAMPLE 7

Figure 7:
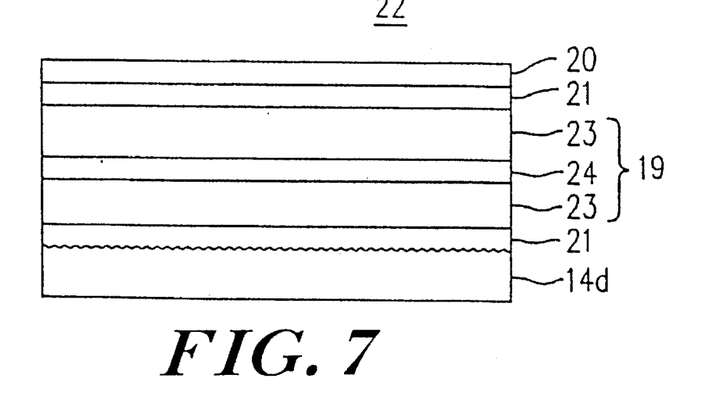
FIG. 7 is a cross sectional view of a reflector integrated with a polarizing film and a retardation film for a liquid crystal display of the seventh example according to the invention.

As shown in FIG. 7, the seventh example of the reflector 22 for a liquid crystal display according to the invention has a reflective film 14d and a polarizing film 18 adhered on the reflective film 14d.

The non-directional reflective film 14d of this example includes a PET film having a thickness of 50 μm, an aluminum layer having a thickness of 400 Å, and a silver layer having a thickness of 200 Å. The PET film has an uneven surface which is obtained by blasting glass beads on the surface. The aluminum layer is formed on the uneven surface of the PET film by vacuum vapor deposition, and the silver layer is formed on the aluminum layer. A polarizing film 19 and a interliner 20 are formed on the reflective film 14d in this order to produce a reflector 22. The polarizing film 19 is pasted on the reflective film 14d with an acrylic adhesive layer 21 sandwiched therebetween. The interliner 20 is also attached to the polarizing film 19 with another acrylic adhesive layer 21 sandwiched therebetween. The polarizing film 19 is constructed by sandwiching a polarizer 24 by two protective layers 23. The reflector 14a, 14b, 14c, 17a, 17b, or 17c shown in Examples 1 to 6 can be used for the reflective film 14d.

The reflector 22 can be used for display modes which require the polarizing film (for example, a three-terminal type LCD, a two-terminal type LCD, an STN type LCD, a TN type LCD, an SH type LCD, an SSFLC, and an antiferroelectric LCD).

EXAMPLE 8

Figure 8:
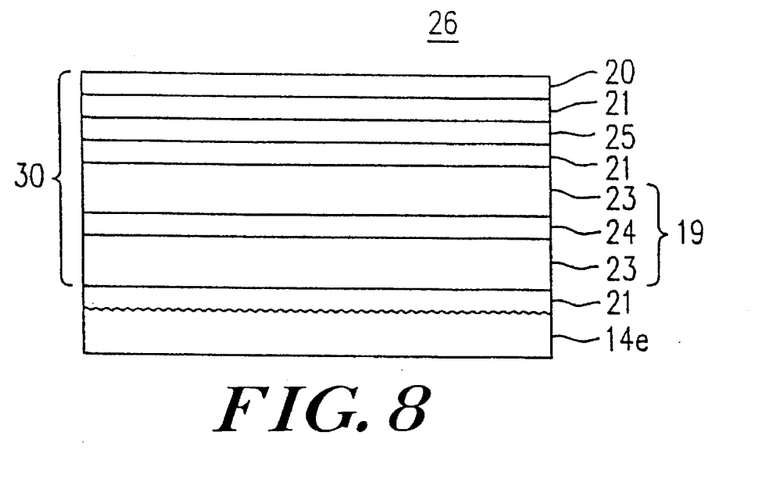
FIG. 8 is a cross sectional view of a reflector integrated with a polarizing film and a retardation film for a liquid crystal display of the eighth example according to the invention.

As shown in FIG. 8, the eighth example of the reflector 26 for a liquid crystal display according to the invention has a reflective film 14e and a polarizing film 30 which includes a retardation film 25 and is formed on the reflective film 14e.

The non-directional reflective film 14e of the example includes a PET film having a thickness of 70 μm, an aluminum layer having a thickness of 500 Å, and a silver layer having a thickness of 250 Å. The PET film contains 5 percent silica sands (quartz sands) by weight and has an uneven surface. The silica sands have an average diameter of 5 μm. The aluminum layer is formed on the uneven surface of the PET film by vacuum vapor deposition. Then, the silver layer is formed on the aluminum layer. A polarizing film 19, a retardation film 25, and an interliner 20 are formed on the reflective film 14e in this order. The polarizing film 19, the retardation film 25, and the interliner 20 are pasted on the reflective film 14e, on the polarizing film 19, and on the retardation film 25 by acrylic adhesive layers 21, respectively. The polarizing film 19 is constructed by sandwiching a polarizer 24 between two protective layers 23. The reflector 14a, 14b, 14c, 17a, 17b, or 17c shown in Examples 1 to 6 can be used for the reflective film 14e.

A stretched film, a polarizing film, or twisted retardation film is used for the retardation film 25 of Example 8. Other materials can be used for the retardation film 25. Since the shadow of the display tends to be thrown onto the polarizing film 19, it is preferable that the polarizing film 19 is as thin as possible. Moreover, the reflector 26 integrated with a polarizing film for a liquid crystal display as shown in Example 8 can be used for the liquid crystal modes which require the polarizing film and the retardation film, such as an STN type LCD, an SH type LCD, an SSFLC or the like.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reflector for a liquid crystal display comprising:
   a first metal layer formed on a plastic film and containing a non-precious metal; and
   a second metal layer formed on the first metal layer and containing a precious metal,
   wherein the first metal layer has a thickness of approximately 400–500 Angstroms.

2. A reflector for a liquid crystal display according to claim 1, wherein the second metal layer has a higher optical reflectivity than that of the first metal layer.

3. A reflector for a liquid crystal display according to claim 1, wherein a non-precious metal contained in the first metal layer is a material selected from a group including aluminum and copper.

4. A reflector for a liquid crystal display according to claim 1, wherein the precious metal contained in the second metal layer is a material selected from a group including gold and silver.

5. A reflector for a liquid crystal display according to claim 1, wherein the thickness of the second metal layer is equal to or larger than 50 angstroms and smaller than 500 angstroms.

6. A reflector for a liquid crystal display according to claim 1, wherein the thickness of the second metal layer is equal to or larger than 100 angstroms and smaller than 300 angstroms.

7. A reflector for a liquid crystal display according to claim 1, wherein the thickness of the second metal layer is smaller than the thickness of the first metal layer.

8. A reflector for a liquid crystal display according to claim 1, wherein the reflector has a transparent protective film formed on the second metal layer.

9. A reflector for a liquid crystal display according to claim 8, wherein the transparent film contains a silicon oxide.

10. A reflector for a liquid crystal display according to claim 1, wherein the reflector has a polarizing film formed above the second metal layer.

11. A reflector for a liquid crystal display according to claim 10, wherein the reflector has a retardation film formed above the polarizing film.

12. A reflector for a liquid crystal display according to claim 1, wherein the surface of the plastic film is roughened.

13. A reflector for a liquid crystal display according to claim 1, wherein the plastic film is selected from a group consisting of a polyethylene terephthalate film, a polypropylene film, a polyamide film, a polycarbonate film, an acetate film and an acrylic film.

14. A reflector for a liquid crystal display comprising:

a plastic film;

a first metal layer formed of a metal foil attached to the plastic film via an adhesive layer, the first metal layer containing a non-precious metal; and a second metal layer formed on the first metal layer and containing a precious metal.

15. A reflector for a liquid crystal display according to claim 14, wherein the surface of the metal foil is roughened and the metal foil has a thickness of approximately 3–30 micrometers.

16. A reflector for a liquid crystal display according to claim 14, wherein the second metal layer has a thickness of approximately 50–500 Angstroms.

17. A reflector for a liquid crystal display according to claim 14, wherein the plastic film is selected from a group consisting of a polyethylene terephthalate film, a polypropylene film, a polyamide film, a polycarbonate film, an acetate film and an acrylic film.

18. A reflector for a liquid crystal display comprising:

a plastic film;

a first metal layer formed of a metal paint applied on the plastic film, the metal paint including a mixture of non-precious metal flakes and a resin material; and a second metal layer formed on the first metal layer and containing a precious metal.

19. A reflector for a liquid crystal display according to claim 18, wherein the second metal layer has a thickness of approximately 50–500 Angstroms.

20. A reflector for a liquid crystal display according to claim 18, wherein the plastic film is selected from a group consisting of a polyethylene terephthalate film, a polypropylene film, a polyamide film, a polycarbonate film, an acetate film and an acrylic film.

* * * * *